US009169014B2

(12) United States Patent
Elson et al.

(10) Patent No.: US 9,169,014 B2
(45) Date of Patent: Oct. 27, 2015

(54) UNMANNED AERIAL VEHICLE AND METHOD OF LAUNCHING (75) Inventors: Andrew Charles Elson, Wells (GB); Peter Davidson, Isle of Man (GB)

(73) Assignee: Astigan Limited, Hampshire (GB)

( * ) Notice: Subject to any disclaimer, the term of this patent is extended or adjusted under 35 U.S.C. 154(b) by 438 days.

(21) Appl. No.: 13/569,360

(22) Filed: Aug. 8, 2012

(65) Prior Publication Data
US 2014/0021288 A1 Jan. 23, 2014

(30) Foreign Application Priority Data
Jul. 20, 2012 (GB) .................................. 1212922.7

(51) Int. Cl.
*B64D 5/00* (2006.01)
*B64C 39/02* (2006.01)

(52) U.S. Cl.
CPC ................ *B64C 39/024* (2013.01); *B64D 5/00* (2013.01); *B64C 2201/021* (2013.01); *B64C 2201/042* (2013.01); *B64C 2201/082* (2013.01); *B64C 2201/104* (2013.01); *B64C 2201/122* (2013.01); *B64C 2201/123* (2013.01); *B64C 2201/162* (2013.01); *B64C 2201/187* (2013.01)

(58) Field of Classification Search
CPC ................ B64C 39/02; B64C 2201/08; B64C 2201/088; B64C 2201/082; B64C 2201/022; B64D 5/00; B64B 1/40
USPC .................................................. 244/2, 63, 31
See application file for complete search history.

(56) References Cited

U.S. PATENT DOCUMENTS

| 4,697,761 | A | 10/1987 | Long |
| 7,207,526 | B2* | 4/2007 | McCarthy .................. 244/199.4 |
| 7,313,362 | B1 | 12/2007 | Sainct |
| 7,530,527 | B2* | 5/2009 | Kelleher .......................... 244/2 |
| 2002/0070313 | A1 | 6/2002 | MacCready et al. |
| 2006/0278757 | A1 | 12/2006 | Kelleher |

FOREIGN PATENT DOCUMENTS

| EP | 2281747 A2 | 7/2010 |
| JP | 2000187081 A | 7/2000 |
| JP | 2003090699 A | 3/2003 |
| WO | 0034122 A1 | 6/2000 |

OTHER PUBLICATIONS

Parry, Daniel, Autonomous Deployment Demonstration Program Completes Flight Testing, Dec. 5, 2011, U.S. Naval Research Laboratory, 2011 news releases.*

(Continued)

*Primary Examiner* — Tien Dinh
*Assistant Examiner* — Vicente Rodriguez
(74) *Attorney, Agent, or Firm* — Kolisch Hartwell, P.C.

(57) ABSTRACT

A method of launching a powered unmanned aerial vehicle at an altitude of at least 13,000 m, the method comprising lifting the vehicle by attachment to a lighter-than-air carrier from a substantially ground-level location to an elevated altitude, causing the vehicle to detach from the carrier while the velocity of the vehicle relative to the carrier is substantially zero, the vehicle thereafter decreasing in altitude as it accelerates to a velocity where it is capable of preventing any further descent and can begin independent sustained flight.

16 Claims, 5 Drawing Sheets (56) References Cited

OTHER PUBLICATIONS

Naval Research Laboratory (NRL) Vehicle "Balloon Drops UAV That Launches Two More UAVS", Sep. 1, 2011 Tempest UAV report on flight test, accessed Oct. 21, 2012 at http://eijournal.com/industry-insights-trends/balloon-drops-uav-that-launches-two-more-uavs.
Nov. 23, 2012 Search Report from Intellectual Property Office of the United Kingdom in GB1212922.7, which is the United Kingdom priority application to this U.S. application.
Nov. 26, 2013, International Search Report of the International Search Authority from The U.S. Receiving Office, in PCT/GB2013/051942, which claims priority to this U.S. application.
Nov. 26, 2013, Written Opinion of the International Search Authority from The U.S. Receiving Office, in PCT/GB2013/051942, which claims priority to this U.S. application.
Aug. 6, 2015, Office Action from US Patent and Trademark Office, in U.S. Appl. No. 14/416,035, which shares the same priority as this U.S. application.

* cited by examiner

UNMANNED AERIAL VEHICLE AND METHOD OF LAUNCHING

CROSS-REFERENCE TO RELATED APPLICATION

This application claims priority to United Kingdom Patent Application No. 1212922.7, filed Jul. 20, 2012, which is hereby incorporated by reference in its entirety.

BACKGROUND

The present invention relates to an unmanned aerial vehicle and a method of launching such a vehicle.

High-altitude, long endurance solar powered aircraft concepts have been proposed for some time. Such vehicles at this altitude provide significant potential benefits. For example, wind strengths and turbulence levels are at a minimum between around 18,000 m and 30,000 m altitude. Additionally, this altitude range is above normal aviation authority certification needs, and large areas of the planet can be observed, with the distance to the horizon being over 500 km. Such unmanned vehicles are therefore suitable for aerial surveys, surveillance and emergency communications in disaster recovery situations.

In 1974, AstroFlight built the first solar powered drone Sunrise I. The promising results of the 10 m span, Sunrise I, led to the Sunrise II, with 4480 solar cells, theoretically capable of attaining a service ceiling of 23,000 m. Sunrise II flew successfully, but broke up in flight at 7,000 m due to a suspected aeroelastic problem.

NASA's High Altitude Solar (HALSOL) project in 1995 saw the flight of the Pathfinder, which reached an altitude of 13,000 m. This was followed by the Pathfinder-Plus which reached 24,500 m, with its 19% efficient silicon solar cells and a payload of 67 kg. Centurion followed with a wing span of 63 m with 62,100 bi-fractal solar cells and a payload of up to 270 kg.

Under NASA's Environmental research Aircraft and Sensor Technology Program (1998-2003) the Centurion was modified to become Helios. The Helios prototype was designed as a proof of concept high-altitude unmanned aerial vehicle that could fly on long endurance environmental science or telecommunications relay missions lasting for weeks or months. Helios made use of 19% efficient silicon based solar cells on the upper wing and lithium batteries. Helios had a constant 2.4 m chord and was assembled in six 12.5 m sections with under wing pods at the juncture of each section. Helios reached an altitude of 29,000 m on solar power. Payload was around 300 kg.

In-flight breakup is thought to be caused by a gust induced aeroelastic wing shape change leading to a control system instability. The resulting pitch oscillation resulted in excessive speeds which caused failure of the wing covering.

In 2005, AC propulsion developed the SoLong aircraft. With the energy storage advances made with Lithium ion batteries (220 WHr/kg), SoLong was able to stay airborne for two half nights, starting with a charged battery at midnight and flying to midnight the next day.

This initial 24 hour flight was followed a few months later with a full 48 hour flight. The present inventor, together with QinetiQ built the Zephyr aircraft (Zephr III) in 2002 in order to film a balloon altitude record attempt at 40,000 m. QinetiQ went on with European funding to develop a ground launch system. In 2007, QinetiQ flew the Zephyr for 83 hours using both 25% efficient solar cells and 350 Whr/kg Lithium Solar batteries. Zephyr reached a record altitude of 29,000 m in 2008. A payload of around 2.5 kg was carried.

The Zephyr holds the official endurance record for an unmanned aerial vehicle for its flight from 9 Jul. to 23 Jul. 2010, lasting 336 hours and 22 minutes (2 weeks/14 days). Record claims have been verified by the Fédération Aéronautique Internationale (FAI) for both duration and altitude. It beat the previous endurance record for unmanned flight by more than a factor of five.

However, these methods of launching an unmanned aerial vehicle at such altitudes involve a ground launching method, whereby the vehicle propels itself from ground level to the relatively calm stratospheric zone above 15-20,000 m.

US 2006/0278757 discloses a method of launching an unmanned aerial vehicle which involves the vehicle being attached to a lighter-than-air carrier from below and does not involve a ground launching approach. Once at the desired altitude the vehicle remains attached to the carrier and begins to fly in an ever-increasingly horizontal attitude, using the carrier as an anchor around which it flies, until it is at a velocity where it is capable of independent flight, whereupon it is separated from the carrier to begin independent and sustained flight.

However, it has been found that such a carrier must carry a significant additional mass, and therefore have a very high lifting force, in order to perform as such an anchor without it itself being moved by the vehicle. It is estimated that the carrier would need a lifting force five to fifteen times that of the weight of the vehicle. If the carrier is a balloon, then such a balloon would have to be very large, e.g 30 m in diameter for a small unmanned aerial vehicle of 75 kg take-off weight.

An improved method of launching an unmanned aerial vehicle into high altitude zones would therefore be highly desirable.

SUMMARY

In one or more embodiments, the present invention relates to a method of launching an unmanned aerial vehicle at an elevated altitude, the method comprising lifting the vehicle by attachment to a lighter-than-air carrier from a substantially ground-level location to the elevated location, causing the vehicle to detach from the carrier while the velocity of the vehicle relative to the carrier is substantially zero, the vehicle thereafter decreasing in altitude as it accelerates to a velocity where it is capable of preventing any further descent and can begin independent sustained flight.

The elevated altitude is typically at least 1000 m in altitude, but is ideally at least 13,000 m in altitude.

In one or more embodiments, the method of the invention thus lifts the unmanned aerial vehicle to an altitude above which the vehicle will reach its flight velocity at. Once at a sufficient altitude, the vehicle is released in such a way that its resulting descent increases its air velocity and lift until such descent provides sufficient air velocity for sustained independent flight.

As there is no relative motion between the carrier and the vehicle, other than the minor relative motions induced by the very local atmospheric conditions, the carrier merely has to have sufficient lift to lift the vehicle to its launch altitude.

Thus, in an embodiment, the ratio of the lifting force of the carrier to the weight of the vehicle is from 1.1:1 to 3:1, more preferably from 1.2:1 to 2:1.

Thus, in one or more embodiments, the invention relates to an unmanned aerial vehicle connected to a lighter-than-air carrier, wherein the ratio of the lifting force of the carrier to the weight of the vehicle is from 1.1:1 to 3:1, more preferably from 1.2:1 to 2:1.

The substantially ground-level location is typically at or very near to the land or sea surface of the planet e.g. within 1,000 m, preferably within 100 m of a land or sea surface.

The unmanned vehicle is typically of the sort that resembles a glider, having at least two aerodynamic lifting surfaces, e.g. wings, a fuselage, a tail and at least one propeller powered by a motor and a power supply, although a wide variety of variations on this basic structure can be envisaged.

Typically the vehicle is solar-powered, comprising solar energy collectors and batteries for storing solar energy. The vehicle is also typically of the long-endurance type, capable of independent flight for extended periods, such as days, weeks, months or even years.

The method of the invention also allows the vehicle to be designed for flight in the stratosphere, which is a considerably calmer region of the atmosphere as compared to the troposphere below. This is because the vehicle can begin its flight and remain in the stratosphere, as it is carried upwards through key risk areas of the high wind loads introduced at 4,500 m to 10,500 m by the carrier.

This results in the removal of a number of significant design constraints, which would otherwise need to be present if the vehicle had to fly itself to such altitudes. Thus, the vehicle can be lighter and more fragile than would be possible for a ground-launched vehicle.

For example, it is well-known that wind loadings are proportional to $\rho u^2$ where $\rho$ is the air density and u is the air velocity. At 20,000 m altitude the air density is about one-fifth that at 12,000 m, and the typical peak mean and eddy velocities are around one-half to one-third. Thus, dynamic wind loadings at 12,000 m are around 20 to 40 times those in the tropopause or stratosphere.

As the vehicle is typically optimized for stratospheric flight, the vehicle does not need to travel through such a range of air densities. This can result in a simpler design, for example doing away with heavy gearing systems for propellers needed for a ground-launched vehicle. This therefore results in a greater weight available for functional payload equipment.

Thus, in one or more embodiments, the invention relates to an unmanned aerial vehicle wherein the total weight of the vehicle is comprised of greater than 30% payload, preferably greater than 40% payload and more preferably greater than 50% payload.

Payload is items carried by the vehicle which do not contribute directly to the flight of the vehicle, e.g. are not involved in providing lift, structure or propulsion. Payload therefore includes solar collectors, batteries and other functional equipment such as cameras, receivers, transmitters, navigational systems, antennas etc carried by the vehicle.

Prior to the moment of release the carrier supports the weight of the vehicle, whose velocity is substantially zero relative to the carrier. This means that the vehicle is not performing any powered motion relative to the carrier during the moment of release. Clearly there may be some relative motion due to local atmospheric conditions, but this is not considered to be relative motion between the vehicle and carrier.

Prior to the moment of release the vehicle is typically tipped forward to a nose-down pitch with wings approximately level, so that at the moment of detachment, the vehicle descends while increasing its air speed in a controlled manner.

Typically the powered motors of the vehicle are only started immediately after the detachment occurs, although they could be started shortly before detachment, provided this induces substantially no relative motion between the vehicle and carrier.

The vehicle may be attached to the carrier in a wide variety of ways, provided it allows for detachment at the launch altitude. For example, the vehicle could be attached to the carrier via at least one cord. Such a cord or cords may be attached to its fuselage and/or on its wings.

However, as the vehicle is designed for flight, some care must be taken that the vehicle does not prematurely enter its flight mode, even without any powered motors, during ascent, when the local wind speeds can be sufficient to induce premature flight conditions. This can be minimized by lifting the vehicle in a wing-tip-up orientation, whereby the wings are substantially vertically arranged. Alternatively, or additionally, control systems could be introduced to prevent such premature flight.

Additionally, in one or more embodiments, the invention relates to a method of flying an unmanned aerial vehicle at an elevated altitude comprising at least two wings comprising solar-energy collectors, the method involving flying the vehicle for an extended period of time with the wings, and therefore the solar collectors, angled towards the sun, so that the glancing angle of sunlight is greater than it would be if the vehicle was flying with its wings in a horizontal orientation, the vehicle comprising means to reduce or eliminate the rate of change of compass bearing during flight.

Thus, the solar collectors are more efficient at collecting solar energy, because they face towards the sun for extended periods of time, allowing more energy to be collected per unit area of solar collector. Thus, either more energy can be collected for a given area of solar collectors, the area of solar collectors can be reduced, or a mix of both can be achieved. However in practice, it will usually be most desirable to reduce the area of the solar collectors as they add weight and cost to the vehicle. Additionally, as the sunlight can be collected from sunrise to sunset, such a reduction can also result in the batteries being of lower capacity, as they only need to operate for a shorter period of effective darkness.

Additionally, as the rate of change of compass bearing can be reduced or eliminated, the vehicle can, to a limited extent, fly with the degree of angle to the horizontal and rate of change of compass bearing being decoupled from each other. For example, the vehicle could fly in a straight line but still have its wings angled from horizontal.

In one or more embodiments, the invention relates to an unmanned aerial vehicle, comprising two wings, a fuselage and a tail, the wings comprising solar collectors, wherein the vehicle comprises means to reduce or eliminate the rate of change of compass bearing during flight with the wings angled to the horizontal.

This has the additional advantage of allowing the vehicle to follow a wider variety of possible flight paths, as the solar energy collected is at least partially independent of the path taken by the vehicle.

Such a vehicle typically includes an automated control system for flying the vehicle at a predetermined flight path which involves angling the wings towards the sun whilst eliminating or reducing the rate of change of compass bearing. The control system is preferably operated by a program installed to operate the control system in said manner.

Such a vehicle can therefore fly for extended periods in a straight line, can turn and bank as a regular unmanned aerial vehicle, however it is capable of flying with its wings to the horizontal whilst not altering its compass bearing.

In some applications it may be desirable for the vehicle to be located at or near a fixed location above the earth, e.g for TV transmission, earth observation and support for mobile phone transmissions. The ability of the vehicle to fly with the angle of its wings decoupled from its flight path therefore allow the vehicle to be used in such applications with much greater efficiency.

For example, the vehicle can follow a path with the sun at a bearing of approximately 90° to the direction of movement, followed by a sharp turn and then a path with the sun at a bearing of approximately 270° to the direction of movement. During each of the periods where the sun is approximately 90° and 270° respectively, the wings can be tilted towards the sun, as discussed above.

A vehicle which is capable of flying with its wings at an angle to the horizontal whilst not altering its compass bearing requires some additional features to allow this to happen. For example, the vehicle can include a blade descending from below the fuselage, or extending from the tailfin. However these tend to introduce additional drag.

It has been found that a particularly advantageous adaptation of the vehicle is to include winglets on the ends of the wings which will reduce trailing vortices and therefore not introduce as much drag. Winglets also reduce the tendency for sideways slip. Such winglets are advantageously descending from the ends of the wings, so that they do not cast a shadow on the wings and therefore the solar collectors.

The vehicle can induce a tilting of its wings from horizontal by the use of flaps on the wings, in known manner.

It has been found that a tilt of even small angles can significantly increase the amount of solar energy collected. Thus, flying at angles of from 1 to 40°, more preferably from 2 to 30°, are desirable.

BRIEF DESCRIPTION OF THE DRAWINGS

The invention will now be illustrated, by way of example, and with reference to the following drawings, in which.

DETAILED DESCRIPTION

Figure 1:
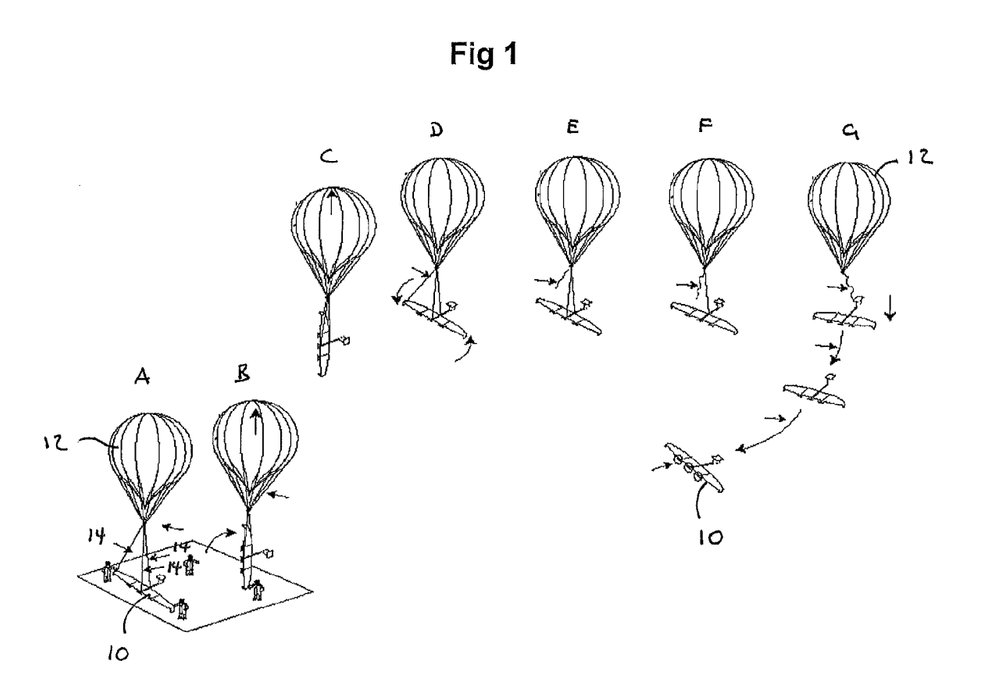
FIG. 1 is a schematic representation of the stages involved in carrying out the method according to an embodiment of the present invention.

Turning to the Figures, FIG. 1 shows an unmanned aerial vehicle 10 attached to a lighter-than-air balloon 12 acting as the carrier at a ground level location at stage A. The vehicle 10 is attached to the balloon by three cords 14, one attached to a wing-tip and two attached to the fuselage.

During launch, the balloon 12 lifts and the vehicle 10 enters a wing-tip-up orientation, as shown in stage B, achieved by pulling on the cord attached to the wing-tip.

The balloon 12 then begins the ascent, carrying the vehicle 10 suspended below in its wing-tip-up orientation, as shown in stage C.

Once at the launch altitude above 13,000 m, the vehicle is moved back into a horizontal attitude by letting out the cord attached to its wing-tip, as shown in stage D.

The cord attached to the wing-tip is then severed, together with one of the cords attached to the fuselage, causing the vehicle 10 to enter a nose-down configuration, as shown in stage E and F.

Finally the last cord is severed, releasing the vehicle to begin its descent, as shown in stage G. The motors are powered and the vehicle increases its flight velocity until it can control its descent and is capable of independent flight.

Figure 2:
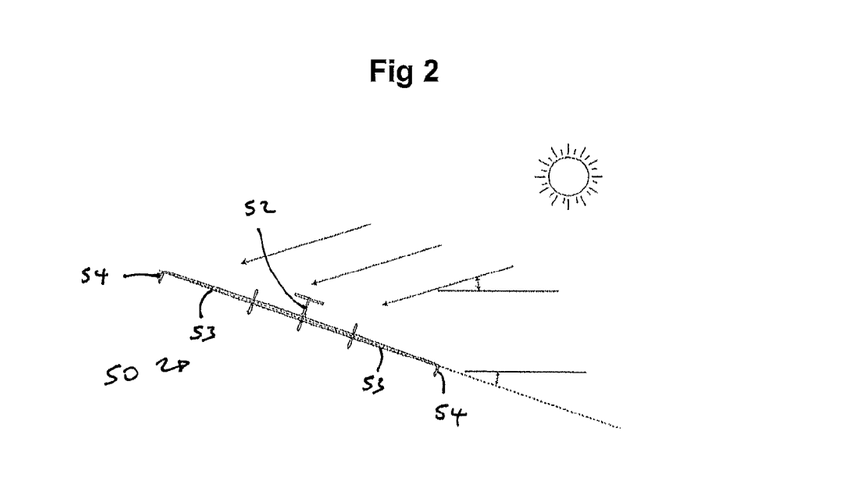
FIG. 2 is a schematic representation of an unmanned aerial vehicle flying according to an embodiment of the present invention.

FIG. 2 shows an unmanned aerial vehicle 50, showing a front elevation of the vehicle. The vehicle has wings 53 which support solar energy collectors (not shown). The vehicle has its wings angled to the horizontal, yet is capable of flying without altering its compass heading. This is achieved by the arrangement of the rudder on the tail 52 and the winglets 54.

As a result of the angle to the horizontal, the glancing angle of the sun is increased, resulting in the solar collectors receiving more solar energy.

Figure 3:
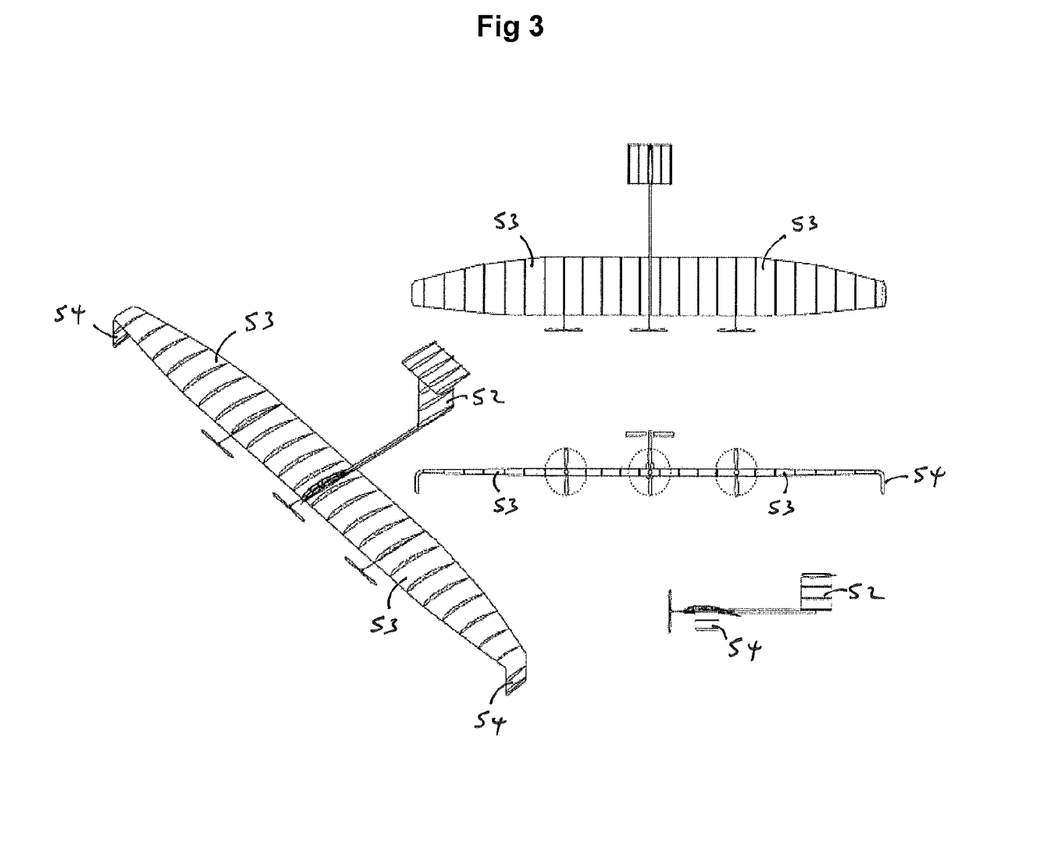
FIG. 3 is a series of views of an unmanned aerial vehicle according to an embodiment of the present invention.

FIG. 3 shows various views of the vehicle shown in FIG. 2.

Figure 4:
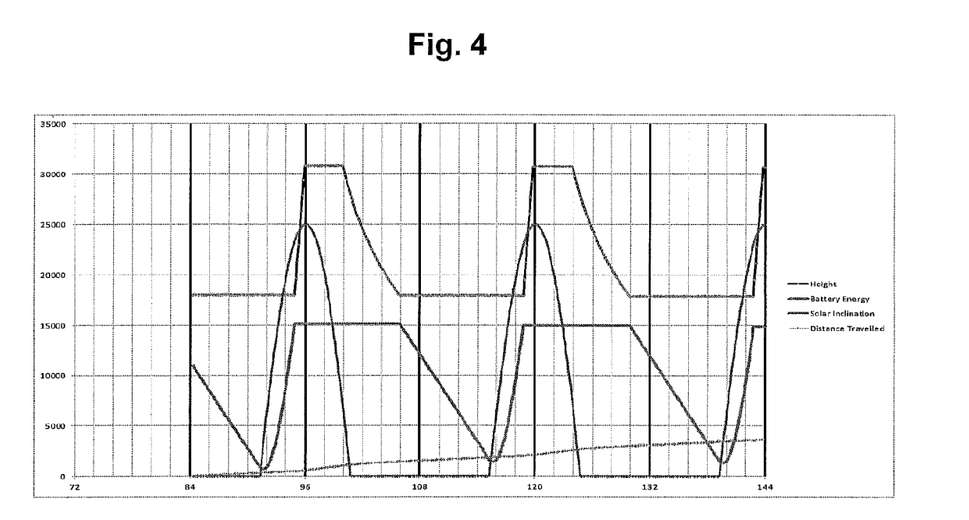
FIG. 4 is a chart showing the calculated glancing angle of sunlight received by an unmanned aerial vehicle flying horizontally at a latitude of 60°, the level of battery power and altitude, over a 48 hour period.

FIG. 4 shows a chart showing the calculated glancing angle of sunlight received by an unmanned aerial vehicle flying horizontally at a latitude of 50°, the level of battery power and altitude, over a 48 hour period.

The pseudo-sinusoidal trace is the glancing angle of the sun to the solar panels on the wings of the unmanned aerial vehicle. As can be seen, when the sun is below the horizon there is no energy received at all, so the amount of battery power available begins to deplete during this period.

The top trace is the altitude of the vehicle as it moved between a daytime cruising altitude of 31,000 m and a nighttime cruising altitude of 18,000 m. As can be seen, as the sun rises, the batteries start to recharge and once fully charged the vehicle climbs to its daytime altitude. As the sun sets the vehicle begins its descent to its nighttime altitude. Even though the sun is below the horizon the batteries are not depleted during the descent because some energy is recovered during descent.

Once at the nighttime altitude, the batteries are depleted until the sun rises again.

The primary reason for cruising at a lower altitude during the night is that is requires less power because the air is denser, and so the velocity the vehicle needs to travel at to achieve sufficient lift is lower. Thus the capacity of the batteries does not have to be so great, thus reducing weight. However, the vehicle could remain at a constant altitude through a day/night cycle.

Figure 5:
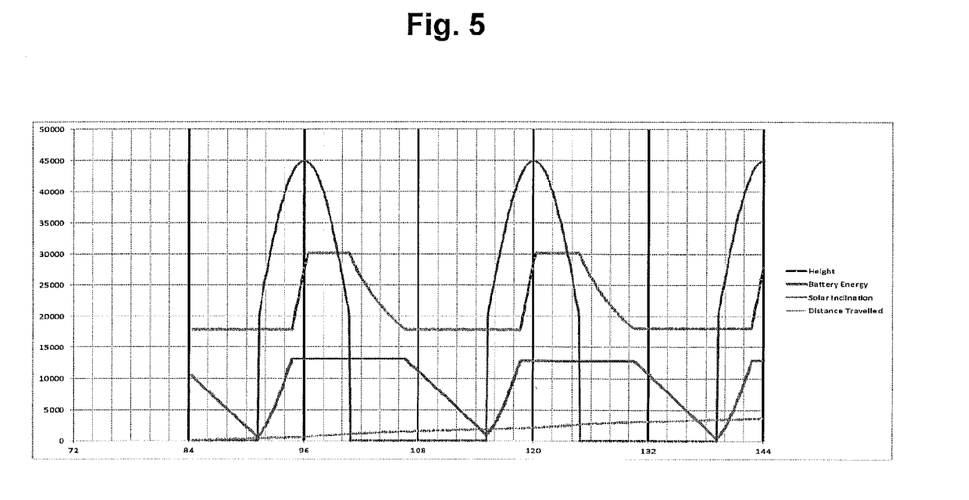
FIG. 5 is a chart showing the calculated glancing angle of sunlight received by an unmanned aerial vehicle flying tilted towards the sun by 20° and at a latitude of 60°, the level of battery power and altitude, over a 48 hour period.

FIG. 5 shows the same flight pattern as in FIG. 4, however in this case the vehicle flies with its wings tilted at 20° to the sun.

As can be seen, as soon as the sun rises above the horizon, the glancing angle is 20° instead of 0° as in FIG. 4. Throughout the day the glancing angle is increased by 20°, providing a significant increase in the amount of solar energy collected. This means that the solar collectors can also start collecting energy right from the moment of sunrise and right up to the moment of sunset, effectively shortening the period of darkness, resulting in a lower capacity of battery being needed.

In this calculation it is estimated that the surface area of the collectors could be reduced by 60% without reducing the amount of solar energy collected, merely by tilting towards the sun.

For an UAV travelling at a modest speed of 20 meters per second, needing to remain within a moderate distance, say 3 km of a given position, when there is little wind a circular flight path over the ground of 3 km in radius can be adopted with the centre of the flight path circle being above the given position. The plane would then take approximately 15 minutes to travel around the circle.

For the period when the sun is above the horizon this flight path can be greatly improved to meet the twin objectives of staying close to a given position and increasing the amount of solar radiation incident on the upper wings of the aircraft.

Figure 6:
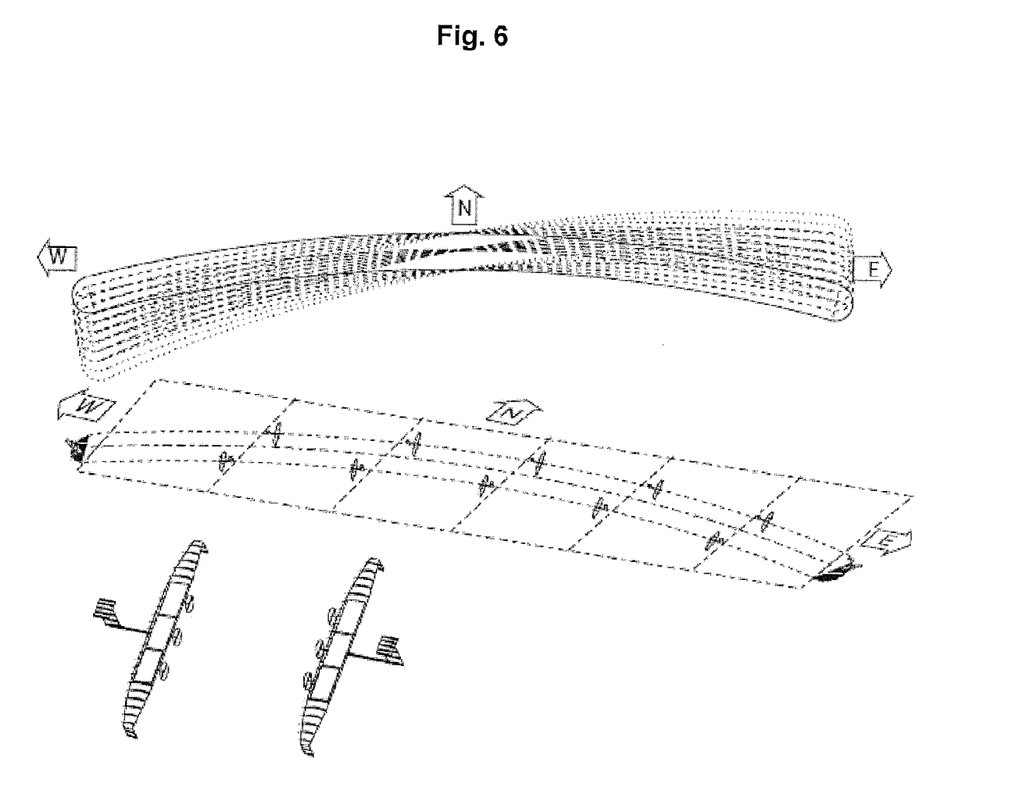
FIG. 6 is a representation of a flight path taken according to an embodiment of the present invention.

For the circular flight path described previously when the plane close to or from the direction of the suns rays, the plane has to be tilted to climb or fall which can be achieved but is relatively wasteful in energy. FIG. 6 shows an improved flight path, enabled by the present invention.

In FIG. 6, the plane is flying from East to West on the southern arc, which is approximately six kilometers long. Its attitude is that of the plane shown on the bottom right, with the direction of the sun almost parallel to right angles to the direction of the flight, and parallel to the direction of the wings.

After completing this arc, the plane turns relatively quickly during which time the incident solar illumination on the wings is much reduced or non-existent. The plane then flies in an Easterly direction in an arc almost parallel to the previous arc. However because the earth is spinning, the direction to the sun moves round by 15 degrees every hour and so to maximise the incident solar illumination on the wings the flight path also needs to rotate.

The upper diagram shows an approximate indication with very modest winds of the resulting flight path. In this case the flight path is approximately 14 km in length so the plane will take approximately 700 seconds or around 11 minutes to progress around the flight path. The flight path therefore needs to be rotated approximately 3 degrees per loop or 1.5 degrees between adjacent long arcs.

Arcs are shown rather than straight lines to allow modest banking which reduces drag when the plane is operated at a tilt.

Figure 7:
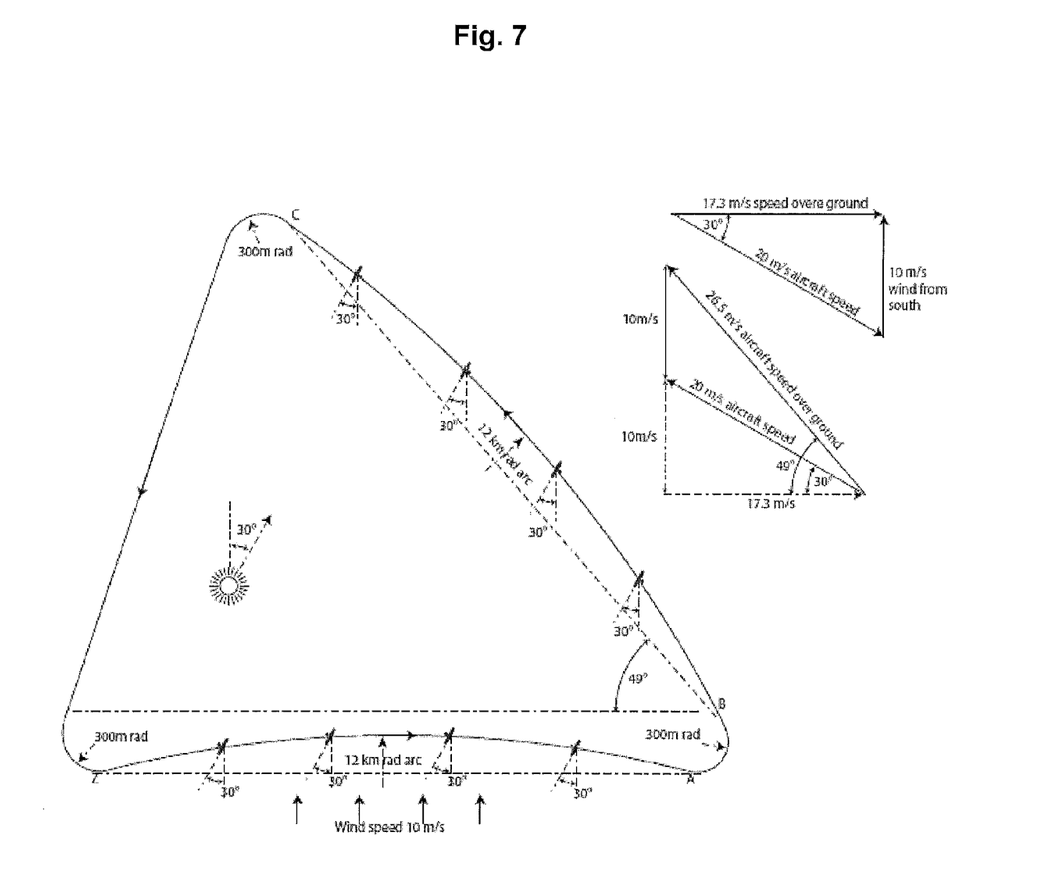
FIG. 7 is a representation of another flight path taken according to an embodiment of the present invention.

FIG. 7 shows an example of the influence of wind on the preferred flight path. In the example taken the flight speed of the aircraft is still 20 m/s but there is a 10 m/s wind speed from the South. Ideally from C to Z the plane would be losing altitude to rotate the wings to allow some incident illumination with a gradual rise in altitude from Z to A to B to C. In arcs ZA and BC the wing orientations are more or less constant for maximum illumination.

Such a flight path needs also to be rotated as in FIG. 6 to follow the path of the sun.

The present disclosure may include one or more of the following concepts:

A. A method of launching a powered unmanned aerial vehicle at an elevated altitude, the method comprising lifting the vehicle by attachment to a light-than-air carrier from a substantially ground-level location to an elevated altitude, causing the vehicle to detach from the carrier while the velocity of the vehicle relative to the carrier is substantially zero, the vehicle thereafter decreasing in altitude as it accelerates to a velocity where it is capable of preventing any further descent and can begin independent sustained flight.

B. The method according to paragraph A, wherein the ratio of the lifting force of the carrier to the weight of the vehicle is from 1.1:1 to 3:1, more preferably from 1.2:1 to 2:1.

C. The method according to paragraph A, wherein the powered motors of the vehicle are only started after the detachment occurs.

D. The method according to any one of the preceding paragraphs, wherein, at the moment of release the vehicle is tipped forward to a nose-down pitch.

E. An unmanned aerial vehicle connected to a lighter-than-air carrier, wherein the ratio of the lifting force of the carrier to the weight of the vehicle is from 1.1:1 to 3:1, more preferably from 1.2:1 to 2:1.

F. An unmanned aerial vehicle wherein the total weight of the vehicle is comprised of greater than 30% payload, preferably greater than 40% payload and more preferably greater than 50% payload.

G. The method or vehicle according to any one of the preceding paragraphs, wherein the elevated altitude is above 1000 m, preferably above 13,000 m.

H. The method or vehicle according to any one of the preceding paragraphs, wherein the vehicle comprises at least two wings, a fuselage, a tail and at least one propeller powered by a motor and a power supply.

I. The method or vehicle according to any one of the preceding paragraphs, wherein the vehicle is solar-powered, comprising solar energy collectors and batteries for storing solar energy.

J. The method or vehicle according to any one of the preceding paragraphs, wherein the vehicle is attached to the carrier via at least one cord.

K. The method or vehicle according to any one of the preceding paragraphs, wherein the vehicle is lifted in a wing-tip-up orientation, whereby the wings are substantially vertically arranged.

L. A method of flying an unmanned aerial vehicle at an elevated altitude comprising at least two wings comprising solar-energy collectors, the method involving flying the vehicle for an extended period of time with the wings, and therefore the solar collectors, angled towards the sun, so that the glancing angle of sunlight is greater than it would be if the vehicle was flying with its wings in a horizontal orientation, the vehicle comprising means to reduce or eliminate the rate of change of compass bearing during flight.

M. An unmanned aerial vehicle, comprising two wings, a fuselage and a tail, the wings comprising solar collectors, wherein the vehicle comprises means to reduce or eliminate the rate of change of compass bearing during flight with the wings angled to the horizontal.

N. A vehicle according to paragraph M, comprising an automated control system for flying the vehicle at a predetermined flight path which involves angling the wings towards the sun whilst eliminating or reducing the rate of change of compass bearing.

O. The vehicle according to paragraph N, comprising a program installed to operate the control system in said manner.

P. The method or vehicle according to any one of paragraphs L to O, wherein the vehicle includes winglets on the ends of the wings.

Q. The method or vehicle according to paragraph P, wherein the winglets descend from the ends of the wings.

R. The method or vehicle according to any one of paragraphs L to Q, wherein the elevated altitude is at least 1000 m, preferably at least 13,000 m.

S. The method or vehicle according to any one paragraphs L to R, wherein the angle of tilt is from 1 to 40°, more preferably from 2 to 30°.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications, and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

What is claimed is:

1. A method of launching a powered unmanned aerial vehicle at an elevated altitude, the vehicle having wings, the method comprising:

lifting the vehicle by attachment to a lighter-than-air carrier from a substantially ground-level location to an elevated altitude, wherein during lifting the vehicle is in a wing-tip-up orientation with the wings of the vehicle in a substantially vertical attitude, reorienting the vehicle at the elevated altitude from the substantially vertical attitude to a substantially horizontal attitude prior to detaching the vehicle from the lighter-than-air carrier, and detaching the vehicle from the carrier while the velocity of the vehicle relative to the carrier is substantially zero, the vehicle thereafter decreasing in altitude as it accelerates to a velocity where it is capable of preventing any further descent and can begin independent sustained flight.

2. The method according to claim 1, wherein the ratio of the lifting force of the carrier to the weight of the vehicle is from 1.1:1 to 3:1.

3. The method according to claim 1, further comprising starting the powered motors of the vehicle only after the detachment from the carrier occurs.

4. The method according to claim 3, wherein, at the moment of release the vehicle is tipped forward to a nose-down pitch.

5. The method according to claim 1, wherein lifting the vehicle by attachment to a lighter-than-air carrier from a substantially ground-level location to an elevated altitude includes lifting the vehicle to an elevated altitude above 1000 m.

6. The method according to claim 1, wherein the ratio of the lifting force of the carrier to the weight of the vehicle is from 1.2:1 to 2:1.

7. The method according to claim 1, further comprising providing that the total weight of the vehicle is comprised of greater than 30% payload.

8. The method according to claim 1, further comprising providing that the vehicle comprises at least two wings, a fuselage, a tail and at least one propeller powered by a motor and a power supply.

9. The method according to claim 1, further comprising providing that the vehicle is solar-powered, comprising solar energy collectors and batteries for storing solar energy.

10. The method according to claim 1, wherein the vehicle is attached to the carrier via at least one cord.

11. The method according to claim 1, further comprising providing that the vehicle includes winglets on the ends of the wings.

12. The method according to claim 11, further comprising providing that the winglets descend from the ends of the wings.

13. The method according to claim 1, further comprising providing that the total weight of the vehicle is comprised of greater than 40% payload.

14. The method according to claim 1, wherein the total weight of the vehicle is comprised of greater than 50% payload.

15. The method according to claim 1, wherein lifting the vehicle by attachment to a lighter-than-air carrier from a substantially ground-level location to an elevated altitude includes lifting the vehicle to an elevated altitude above 13,000 m.

16. The method according to claim 1, further comprising detaching the vehicle from the carrier while the vehicle remains substantially stationary relative to the carrier.

* * * * *